United States Patent [19]
King, Jr.

[11] 3,983,736
[45] Oct. 5, 1976

[54] HELICALLY WOUND MANDREL ASSEMBLY

[76] Inventor: John O. King, Jr., 3990 N. Ivy Road, Atlanta, Ga. 30342

[22] Filed: Jan. 17, 1975

[21] Appl. No.: 542,075

[52] U.S. Cl. .................................. 72/362; 72/481; 85/64; 72/479
[51] Int. Cl.² ......................................... B21D 31/04
[58] Field of Search ............ 72/479, 481, 370, 103, 72/114, 118, 119, 362; 29/446, 523; 85/32 CS, 64

[56] References Cited
UNITED STATES PATENTS

| | | | |
|---|---|---|---|
| 2,868,056 | 1/1959 | Latorre | 85/64 |
| 3,316,795 | 5/1967 | Tann | 85/32 CS |
| 3,515,027 | 6/1970 | Textrom | 85/32 CS |

Primary Examiner—Lowell A. Larson
Attorney, Agent, or Firm—B. J. Powell

[57] ABSTRACT

A mandrel assembly for expanding holes through work pieces including a helically wound coil member with interconnected helical flights and a support member with the support member supporting the flights of the coil member so that the leadingmost flight has a first effective outside diameter smaller than the initial hole diameter and at least one of the flights trailing the leadingmost flight has a second effective outside diameter larger than the first outside diameter of the leadingmost flight. The support member may be a threaded fastener supporting the flights of the coil member by its threads or have a tapered support section to support the coil member. The method of using the mandrel assembly is contemplated.

11 Claims, 15 Drawing Figures

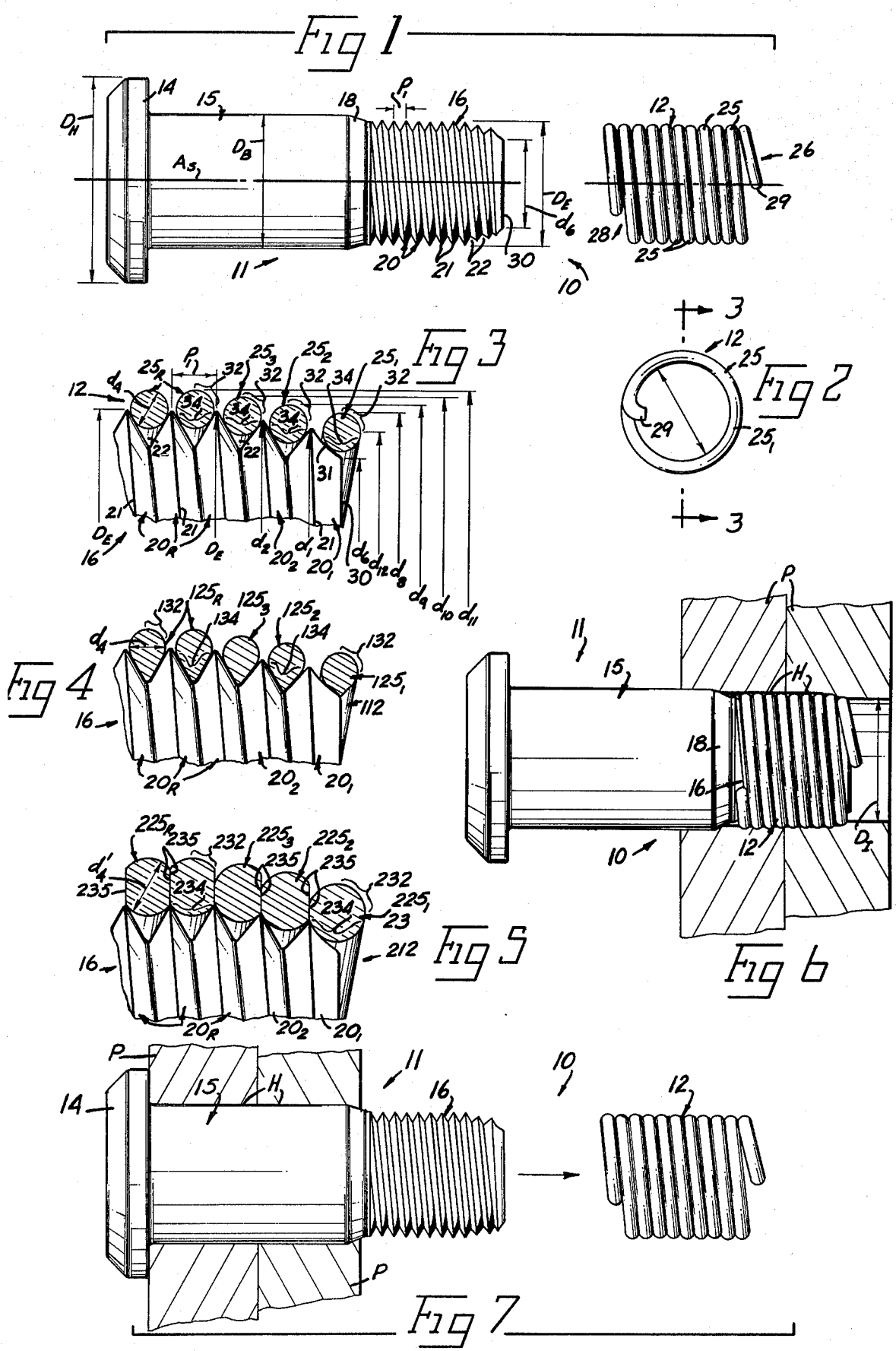

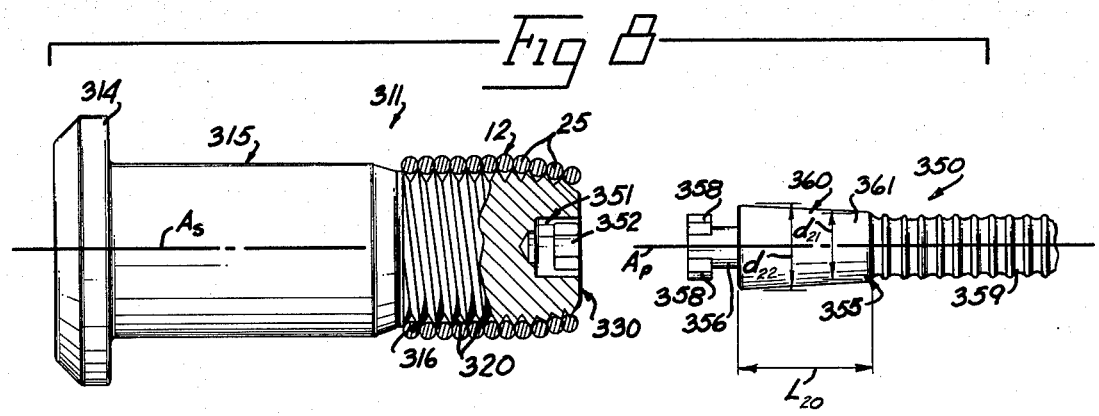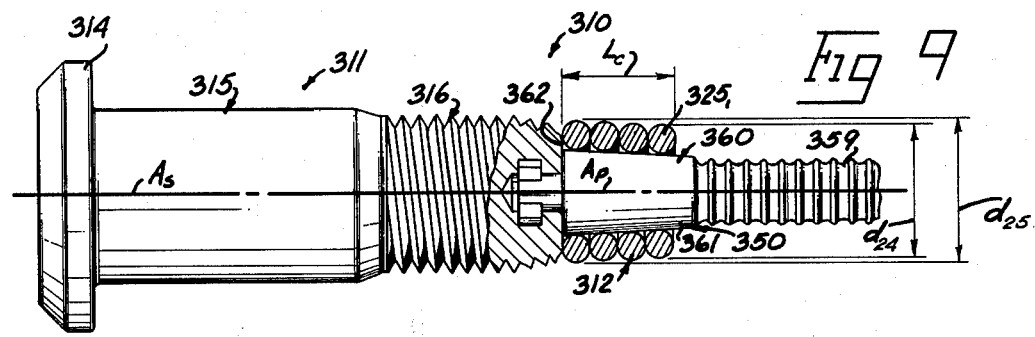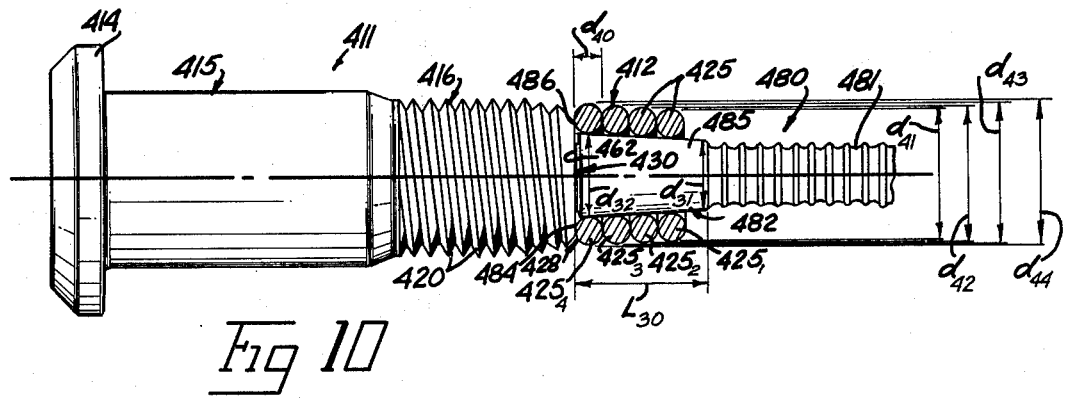

HELICALLY WOUND MANDREL ASSEMBLY

BACKGROUND OF THE INVENTION

As fastener joints in work pieces have become more highly stressed, especially in the aerospace industry, a great deal of effort has been expended in an attempt to increase the fatigue life of the fastener joints. One of the most successful techniques that has been used is commonly referred to as coldworking in which the holes through the work pieces are expanded beyond the elastic limit of the material of the work pieces prior to the installation of the fastener through the holes. This causes a compressive stress gradient to be induced in the work pieces immediately adjacent the holes that serves to increase the fatigue life of the resulting joint. Several techniques have been conceived which coldwork the holes such as those disclosed by U.S. Pat. Nos. 3,270,410; 3,434,327; 3,566,662; 3,805,578; and 3,835,688. All of these techniques use a single piece mandrel with a continuous machined and ground expansion surface thereon that is usually polished and which is pulled or pushed through the holes either with or without a sleeve member.

Because these mandrels have been made of one piece, however, it has been difficult to achieve the necessary hardness in the enlarged portion of the mandrel which contacts and expands the hole while at the same time being able to achieve the necessary toughness in that portion of the mandrel which is used to pull the mandrel through the hole. As a result, the prior art has had to resort to the use of exotic lubricants and to the use of sleeve members to isolate the surface of the hole from the expansion surface of the mandrel in order to be able to physically pull the mandrel through the hole and also not damage the hole. Also the expansion surface has frequently become damaged requiring it to have to be resurfaced by machining, grinding, and/or polishing operations or the mandrel thrown away.

Because of the critical dimensional tolerances that must be provided in the mandrel, the continuous expansion surfaces were usually made by first rough machining the surface followed by a grinding operation to preliminarily shape the surface. The grinding operation was usually followed by a honing operation which finally sized and shaped the surface and then the surface was finally polished to prepare it for the coldworking operations. All of these manufacturing steps make the cost of preparing the expansion surface on the mandrel relatively expensive. This has resulted in a reluctance on the part of the industry to use the technique of coldworking the hole unless it was determined to be absolutely necessary in order to limit the production cost of the item which is to be coldworked.

SUMMARY OF THE INVENTION

These and other problems and disadvantages associated with the prior art are overcome by the invention disclosed herein by providing a two-piece mandrel assembly utilizing a helically wound coil member that defines the expansion surface thereon and a support member which supports the helically wound coil member while the helically wound coil member is forced through the holes. Both the coil member and the support member can be manufactured using inexpensive manufacturing techniques while still being maintained within the dimensional tolerances required for coldworking techniques. Also, the desired hardness can be obtained in the coil member while the desired toughness can be obtained in the support member. The invention also allows either all or part of the mandrel assembly to be replaced without significant cost.

The apparatus of the invention includes a helically wound coil member with interconnected helical flights and a support member for supporting the coil member about a central axis so that the leading helical flight has an effective outside diameter smaller than the initial hole diameter and at least one of the helical flights trailing the leading helical flight has an effective outside diameter larger than the initial hole diameter. The support member may be in the form of a threaded fastener where the threads on the fastener serve as the support for the coil member with the coil member incorporating the difference in diameters of the leading threads on the fastener to produce an overall expansion surface defined by the helical flights. The support member may be provided with a pulling section for use in forcing the coil member through the holes to expand them and the supporting surface on the support member can be made at prescribed configuration to define the desired overall expansion surface shape for expanding the holes. Also, the cross-sectional shape of the helical flights of the coil member may be varied to assist in captivating the coil member on the support member.

These and other features and advantages of the invention will become more apparent upon consideration of the following specification and accompanying drawings wherein like characters of reference designate corresponding parts throughout the several views and in which:

BRIEF DESCRIPTION OF THE DRAWINGS

FIG. 1 is an exploded perspective view of one embodiment of the invention;

FIG. 2 is a leading end view of the coil member of FIG. 1;

FIG. 3 is an enlarged partial transverse cross-sectional view taken along line 3—3 in FIG. 2 showing the coil member mounted on the support member;

FIG. 4 is a view similar to FIG. 3 showing an alternate cross-sectional shape in the helical flights of the coil member;

FIG. 5 is a view similar to FIG. 3 showing another alternate cross-sectional shape for the helical flights of the coil member;

FIGS. 6 and 7 illustrate that embodiment of the invention of FIG. 1 being used;

FIG. 8 is an exploded side elevational view shown partly in cross-section of a second embodiment of the invention;

FIG. 9 is a view similar to FIG. 8 showing the coil member located differently;

FIG. 10 is a side elevational view of a third embodiment of the invention;

Figure 11:
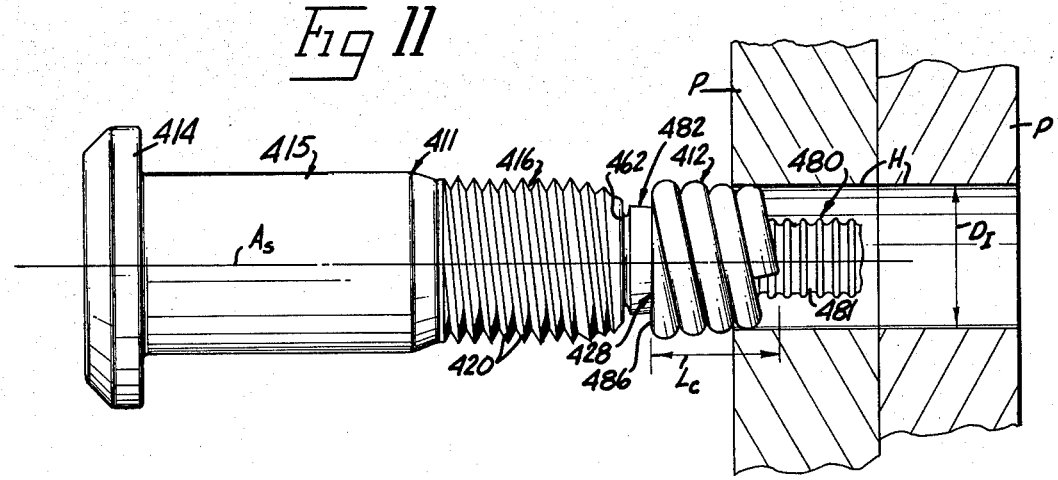
FIGS. 11–13 illustrate the third embodiment of the invention being used.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

The first embodiment of the invention is best seen in FIGS. 1–3, 6 and 7 and is denoted generally as mandrel assembly 10. The mandrel assembly 10 includes a support member 11 and a helically wound coil member 12. The coil member 12 is carried by the support member 11 as best seen in FIG. 6 so that the support member 11 can be used to force the coil member 12 through the holes in the work pieces to enlarge them.

It will be seen that the support member 11 is a threaded fastener with a head 14 at the trailing end thereof concentric about its central axis $A_s$, a bearing section 15 integral with the head 14 and projecting therefrom concentric with axis $A_s$, and an engagement section 16 at the leading end of the bearing section 15 and concentric about axis $A_s$. The head 14 has a diameter $D_H$, the bearing section 15 has a nominal diameter $D_B$ and the engagement section 16 has a major diameter $D_E$. The engagement section 16 is joined to the bearing section 15 through a transition section 18.

The engagement section 16 defines interconnected helical threads 20 thereon having a size and shape normally associated with a standard fastener. The threads 20 have crests 21 that define root valleys 22 therebetween as is normally associated with threaded fasteners. The diameter of the crests 21 is the major diameter $D_E$ of the engagement section 16. It will further be noted that the threads 20 hae a prescribed pitch $P_1$, which is the longitudinal distance between crests 21, that is standard for fasteners. It will further be noted that the leading threads 20 form a lead-in for the engagement section 16. As best seen in FIG. 3, the leading most thread $20_1$ has a crest diameter $d_1$ that is a prescribed amount less than the diameter $D_E$. The next trailing thread $20_2$ has a crest diameter $d_2$ that is greater than diameter $d_1$ and less than diameter $D_E$. The remaining threads $20_R$ have the crest diameter $D_E$. These differences in diameters $d_1$, $d_2$, and $D_E$ are utilized in the invention to define the expansion surface for enlarging the holes as will become more apparent.

The coil member 12 includes a plurality of interconnected helically arranged flights 25. Each flight 25 has a generally circular cross-sectional shape of diameter $d_4$ as seen in FIG. 3. The coil member 12 has a leading end 26 and a trailing end 28 as best seen in FIG. 1 with the leadingmost flight $25_1$ of the coil 12 having an inwardly directed tang 29 on the end thereof. It will further be noted that the flights 25 have a normal relaxed inside diameter $d_5$ which is less than the minimum root diameter $d_6$ of the leadingmost thread $20_1$ of the engagement section 16 as will become more apparent. The flights 25 are made out of a strong resilient material such as spring tempered steel so that the flights 25 may be resiliently expanded. It will also be noted that the cross-sectional diameter $d_4$ of each of the flights 25 is less than the pitch $P_1$ of the threads 20 as will become more apparent. Because the helical flights 25 are resilient, the coil member 12 can be screwed onto the threads 20 of the engagement section 16 as illustrated in FIGS. 3 and 6 until the tang 29 abuts the leading end 30 of the support member 11 to limit its movement. The leadingmost helical flight $25_1$ of the coil member 12 is expanded to the outside diameter $d_8$, the next trailing flight $25_2$ is expanded to the outside diameter $d_9$, the next trailing flight $25_3$ is expanded to the outside diameter $d_{10}$, the remaining helical flights $25_R$ are expanded to the outside diameter $d_{11}$. Thus, it will be seen that the outermost points on each of the helical flights 25 define an expansion surface tapering outwardly from flight $25_1$ to flight $25_R$. The natural resiliency of the flights 25 also serve to retain the coil member 12 onto the threads 20 and that adjacent threads 20 captivate one of the flights 25 therebetween. The forward face 31 of the leadingmost thread $20_1$ is engaged by the leadingmost flight $25_1$ on the coil member 12.

As best seen in FIG. 6, the initial hole diameter $D_I$ must be greater than the expanded mean diameter $d_{12}$ of the leadingmost helical flight $25_1$ in order for the coil member 12 to be started in the holes. For an interference fit, the diameter $D_I$ must be less than the diameter $D_B$ of the bearing section 15. The outside diameter $d_8$, $d_9$, $d_{10}$ or $d_{11}$ of each of the flights 25 is also greater than the mean expanded diameter of the next trailing flight so that all of the flights will pass into the holes H. The outside diameter $d_{11}$ of the remaining flights $25_R$ is that diameter to which the holes H through the work pieces P are to be expanded as the support member 11 forces the coil member 12 through the holes. Thus, each of the helical flights 25 define a hole expansion subsurface 32 on the outside thereof which engages the hole surface to expand it to the outside diameter of that particular flight.

Because the threads 20 can be accurately and inexpensively rolled into the engagement section 16 and because the coil member 12 can be made on a conventional spring coiling machine, the mandrel assembly 10 can be very inexpensively made. The wire stock from which coil 12 is made usually is sufficiently smooth to eliminate subsequent finishing operations. However, if further polishing or burnishing is desired, the expansion subsurfaces 32 can be batched finished by an inexpensive operation such as tumbling to burnish and polish them. The cross-sectional diameter $d_4$ of the flights 25 can be accurately controlled as the wire stock is made by drawing or rolling which serves to accurately control the expanded diameters $d_8$–$d_{11}$ since the inside bearing subsurface 34 on each of the flights 25 is positively engaged between adjacent threads 20.

A second version of the coil member is illustrated in FIG. 4 and designated generally by the reference number 112. Those portions of the coil member 112 which are common to the coil member 12 have the corresponding reference numbers applied thereto displaced by 100. It will be noted that the basic difference between the coil member 112 and the coil member 12 is that the coil member 112 has a generally V-shaped inside bearing subsurface 134 on flights 125 shaped to conform to the threads 20. This results in increasing the amount of axial load that may be imposed on the coil member 112 through the support member 11.

A third version of the coil member is illustrated in FIG. 5 and is designated generally by the numeral 212. Those portions of the coil member 212 which are common to the coil member 12 have corresponding reference numbers applied thereto displaced by 200. It will be seen that each of the helical flights 225 of the coil member 212 has a cross-sectional diameter $d_4'$ which is larger than the diameter $d_4$ and also greater than the pitch $P_1$ of threads 20 on the support member 11. Mating land surfaces 235 are provided on each of the flights 225 so that the flights 225 will fit between the threads 20 and the land surfaces 235 can bear against each other as illustrated in FIG. 5 so that the axial load imposed on the coil member 212 as the coil member 212 is forced through the holes H is uniformly distributed throughout the coil member 212.

SECOND EMBODIMENT

FIG. 8 shows a second embodiment of the invention which includes a modified support member 311, the leading end 330 of which is designed to be releasably connected to a pulling section 350 so that the support member 311 can be pulled into the holes through the work pieces. The support member 311 is the same as the support member 11 except that the leading end of the engagement section 316 is provided with a pull passage 351 therein concentric about the axis $A_s$ and which opens onto the leading end 330 of the engagement section 316. A pair of opposed arcuate lips 352 project into the passage 351 at its mouth to define a lip receiving chamber behind the lips 352 within the passage 351.

The pulling member 350 has a main body 355 with a locating pin 356 on the trailing end thereof concentrically about the axis $A_P$ of the pulling member. The trailing end of the locating pin 356 defines a pair of opposed arcuate locking flanges 358 thereon which are shaped to pass into the passage 351 past the lips 352 when the pulling member 350 is in one relative rotational position with respect to the support member 311. The flanges 358 and the lips 352 are further designed so that when the flanges 358 are inserted into the passage 351 and the pull member 350 rotated 90° with respect to the support member 311, the locking flanges 358 pass into axial registration with the lips 352 so that the pulling section 350 is positively, yet releasably, locked onto the leading end of the support member 311 as seen in FIG. 9. The pulling member 350 defines a pulling section 359 with alternating lands and grooves on the leading end thereof which are adapted to be engaged with a pulling device such as a lockbolt installation gun to pull the pulling member 350 through the holes and the support member 311 into the holes. Thus, with the coil member 12 on the engagement section 316 as illustrated in FIG. 8, the pulling member 350 can be connected to the end of the support member 311 so that the support member 311 and pulling member 350 are coaxial. Then the assembly is pulled into position through the holes. After the support member 311 has been pulled into the holes, the pulling member 350 can be detached from the leading end of support member 311, the coil member 12 removed therefrom and the installation finalized by screwing a conventional nut (not shown) onto the projecting engagement section 316 of the support member 311.

As illustrated in FIG. 9, the pulling member 350 may be provided with a support section 360 on the main body 355 thereof adjacent the trailing end thereof. The support section 360 can receive a coil member 312 thereon which is the same as the coil member 12 except that the cross-sectional diameter of the flights 325 of the coil member 312 are larger, the relaxed inside diameter of the coil member 312 is smaller, and the tang is eliminated from the leading flight 325 of the coil member 312. Thus, it will be seen that the support surface 361 on the support section 360 determines the outside shape of the coil member 312 rather than the threads 320 on the support member 311. It will be seen that the support section 360 has a length $L_{20}$ which is generally equal to the length $L_c$ of the coil member 312, a leading diameter $d_{21}$, and a larger trailing diameter $d_{22}$ so that when the coil 312 is in position on the support surface 361, the leadingmost flight $325_1$ has an expanded outside diameter $d_{24}$ which is slightly less than the inside hole diameter $D_I$. The expanded outside diameter of each of the trailing flights 325 behind the leading flight $325_1$ have incrementally greater diameters out to a major expansion diameter $d_{25}$ which is larger than the initial hole diameter $D_I$. The relative movement of the coil member 312 on the support section 360 in the trailing direction is arrested by the forwardly facing leading shoulder 362 on the forward end 330 of the support member 311. Thus, it will be seen that the mandrel assembly 310 shown in FIG. 9 would be pulled through the holes in the same manner as the mandrel assembly illustrated in FIG. 8. After the mandrel assembly 310 is pulled into the holes, the coil member 312 as seen in FIG. 9 can be slidably removed from over the pulling member 350 and a conventional nut threaded onto the threads 320 with the pulling member 350 still in position so that the resulting joint can be preloaded.

THIRD EMBODIMENT

FIG. 10 illustrates the third embodiment of the invention which uses a modified support member 411 and the coil member 412. Basically, the support member 411 is the support member 11 with a driving portion 480 integral with the leading end 430 of the engagement section 416. The driving portion 480 includes a leading pulling section 481 similar to the pulling section 357 on the pulling member 350 and a support section 482 at the trailing end thereof similar to the support section 360 on the pulling member 350. Also, a breakneck groove 484 may be provided at the juncture of the drive portion 480 and the leading end 430 of the engagement section 416 so that the breaking of the driving portion 480 from the engagement section is facilitated.

The support surface 485 on the support section 482 determines the outside shape of the coil member 412. It will be seen that the support surface 485 has a length $L_{30}$ which is generally equal to the length $L_c$ of the coil member 412 and is frusto-conical in shape tapering outwardly from a leading diameter $d_{31}$ to a trailing diameter $d_{32}$ as will be explained.

Figure 12:
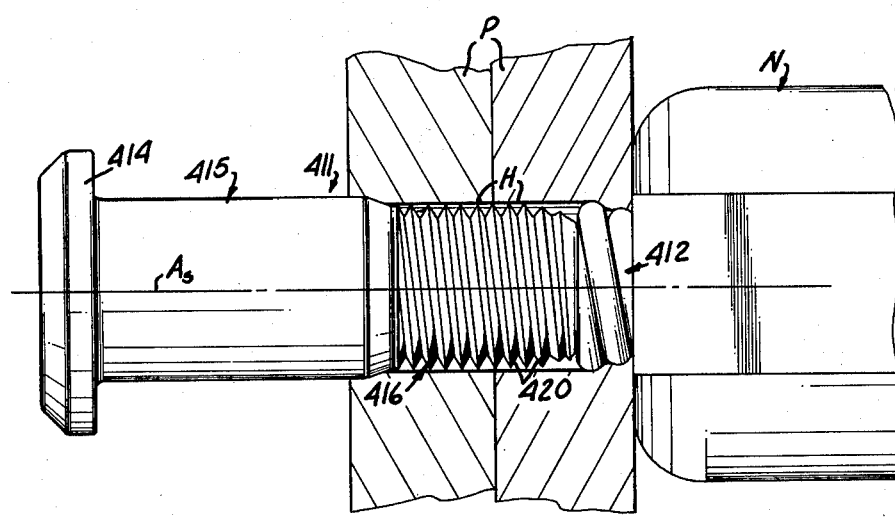
Figure 13:
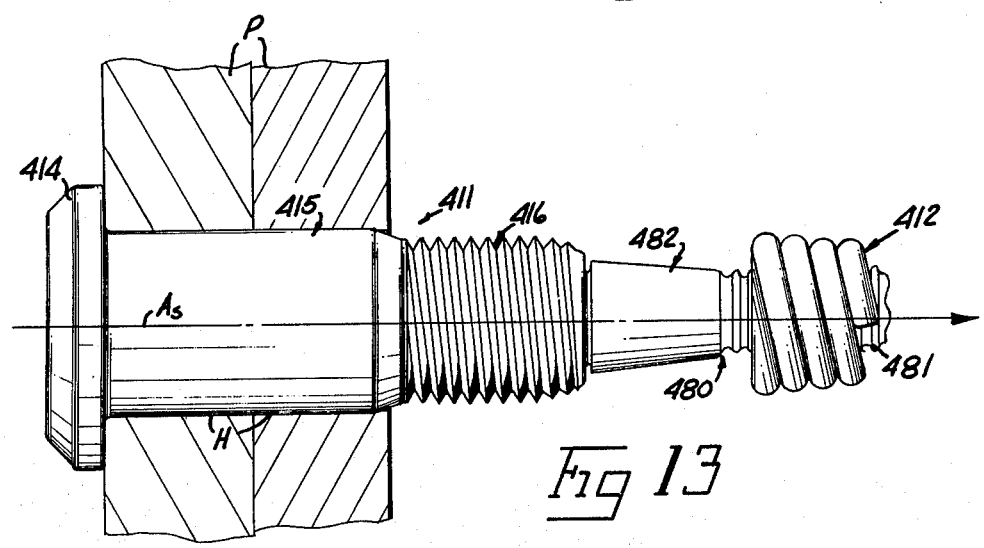

The coil member 312 may be used on the driving portion 480 of the support member 411, however, a slightly different coil member 412 is illustrated in FIGS. 10–13. The coil member 412 includes a plurality of interconnected helically arranged flights 425 similar to the flights 325 on member 312. It will be seen that the trailing end 428 of the coil member 412 is ground flat to define a driven face 486 thereon to be engaged by the forwardly facing leading shoulder 462 on the leading end of the engagement section 416. Each of the flights 425 has a generally circular cross-sectional shape of a diameter $d_{40}$ as seen in FIG. 10. The flights 425 are made out of a strong resilient material similarly to the flights of the other coil members such as spring tempered steel so that flights 425 may be resiliently expanded in order that the coil member 412 can be forced onto the support section 482 of the driving portion 480. It will thus be seen that each of the flights 425 has a normal relaxed inside diameter which is less than the diameter to which it is to be expanded and that each of the flights 425 has a slightly larger mean diameter than the next adjacent leading flight so that the coil 412 tapers outwardly from its leading to trailing end. Thus, when the coil member 412 is placed on the driving portion 480 as illustrated in FIG. 11, at least some of the flights 425 will engage the support surface 485 forward of the point at which it will finally rest when the coil member has been expanded. As the driving portion 480 is gripped and pulled through the holes H in the work pieces P, it will be seen that the engagement between the coil member 412 and the work pieces P will force the coil member 412 up along the support surface 485 until the driven face 486 on the coil member 412 engages the shoulder 462 on the engagement section 416 as seen in FIG. 10. In this position which is shown in FIG. 10, it will be seen that the leadingmost helical flight $425_1$ of the coil member 412 is expanded to the outside diameter $d_{41}$ substantially equal to the initial hole diameter $D_I$, the next trailing flights $425_2$ is expanded to a slightly greater outside diameter $d_{42}$, the next trailing flight $425_3$ is expanded to a slightly larger outside diameter $d_{43}$ and the final trailing flight $425_4$ is expanded to the slightly greater outside diameter $d_{44}$. The outside diameter $d_{44}$ is greater than the initial hole diameter $D_I$ by that amount which the holes are to be expanded. Thus, it will be seen that the outermost points on each of the helical flights 425 define an overall expansion surface which tapers outwardly from flight $425_1$ through flight $425_4$. Thus, as the coil member 412 is forced through the holes, the shoulder 462 on the leading end of the engagement section 416 keeps the flights 425 in a relative stationary position and expands the holes as seen in FIG. 12. Once the flights 425 have passed through the holes, however, the coil member 412 can be easily moved from the support section 484 by passing the coil member 412 forwardly over the pulling section 481 and remove it as seen in FIG. 13.

Figure 14:
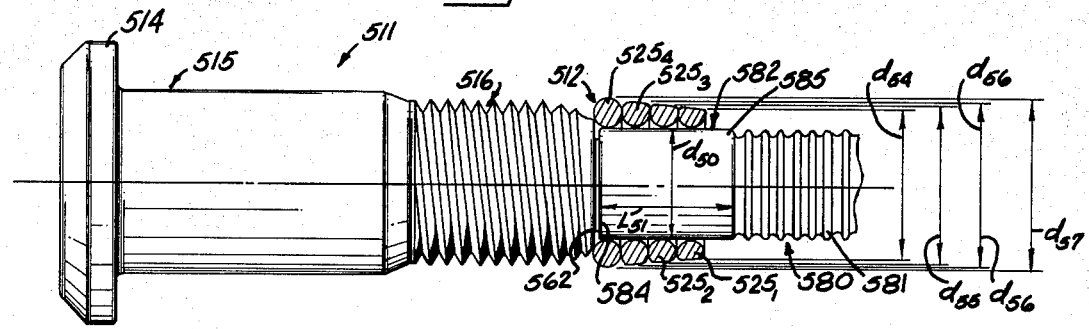
FIG. 14 is a partial view showing a modified form of the embodiment illustrated in FIG. 10; and, FIG. 15 is a partial view showing another form of the embodiment illustrated in FIG. 10.

FIG. 14 illustrates a modified version of the support member 411 and coil member 312 which are respectively designated 511 and 512. The support member 511 is the same as member 411 except that the support surface 585 has a constant diameter $d_{50}$ along its length $L_{51}$.

The coil member 512 is the same as coil member 312 except that the tapering overall expansion surface of the member 512 is formed in the helical flights 515 where the inside diameter of flights 515 is constant and substantially equal to diameter $d_{50}$ of surface 585. Thus, the leadingmost helical flight $525_1$ of the coil member 512 has the outside diameter $d_{54}$ less than the initial hole diameter $D_I$, the next trailing flight $525_2$ has a slightly greater outside diameter $d_{55}$, the next trailing flight $525_3$ has a slightly larger outside diameter $d_{56}$ and the final trailing flight $525_4$ has a slightly greater outside diameter $d_{58}$. The outside diameter $d_{58}$ is greater than the initial hole diameter $D_I$ by that amount which the holes are to be expanded. The outermost points on each of the helical flights 525, then, define an overall expansion surface which tapers outwardly from flight $525_1$ through flight $525_4$. As the coil member 512 is forced through the holes, the shoulder 562 on the leading end of the engagement section 516 keeps the flights 525 in a relative stationary position and expands the holes similarly to the coil member 412.

Figure 15:
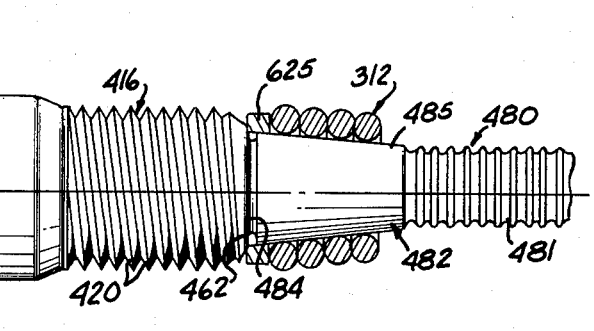

FIG. 15 illustrates the support member 411 and coil member 312 with a back-up washer 625 carried on support surface 485 behind coil member 312. The washer 625 has an inside diameter which centers it on surface 485 so that the leading end 430 of support member 411 engages the back side of washer 625 while the coil member 312 engages the forward side. This serves to separate the bearing force of coil member 312 from the threads 420. The back-up washer 625 is removed with coil member 312 after use.

I claim:

1. A mandrel assembly for use in expanding holes of an initial nominally constant diameter through work pieces comprising:
   a helically wound coil member having a leading end and including a plurality of interconnected resilient helical flights; and,
   a support member engaging and supporting said coil member about a central axis so that at least the leading helical flight has a first effective outside diameter smaller than the initial hole diameter, at least one of the intermediate helical flights trailing the leading helical flight has a second effective outside diameter larger than the initial hole diameter, and at least the trailing helical flight having a third effective outside diameter larger than said second effective outside diameter so that when said coil member is axially forced through the holes, leading end first, while supported on said support member, said intermediate and trailing flights on said coil member will expand the holes from the initial nominally constant diameter along the length of the holes through the second effective diameter by said intermediate flight and finally to the third effective diameter by said trailing flight to radially expand the holes along their length.

2. The mandrel assembly of claim 1 wherein said support member includes a fastener having a central axis and a leading end comprising:
   a bearing section concentric with the fastener central axis adapted to be received through the holes;
   a head on the trailing end of said bearing section; and,
   an externally threaded engagement section on the leading end of said bearing section mounting said coil member thereon, said engagement section defining interconnected helical threads therearound, each of said helical flights of said coil member carried by adjacent threads on said engagement section, the leading thread having a crest diameter smaller than the maximum crest diameter of the other threads and each of said helical flights of said coil member having a cross-sectional leading-to-trailing width at least as small as the pitch of said threads.

3. The mandrel assembly of claim 2 wherein each of said helical flights of said coil member have a circular cross-sectional shape of a diameter at least as small as the pitch of said thread.

4. The mandrel assembly of claim 2 wherein each of said threads has a circular outside cross-sectional shape and a V-shaped inside cross-sectional shape complementary to the shape of said threads.

5. The mandrel assembly of claim 2 wherein each of said flights of said coil member have outside and inside circular cross-sectional shape of a diameter larger than the pitch of said thread, and flat leading and trailing lands adapted to bear against the land of said adjacent helical flight when said coil member is mounted on said thread, the distance between said lands substantially equal to the pitch of said thread.

6. The mandrel assembly of claim 1 wherein said support member includes a support section defining a support surface concentric about said central axis and tapering outwardly from the leading to the trailing end of said support section from a fourth outside diameter less than said first effective outside diameter by the thickness of said leading helical flight to a trailing fourth outside diameter smaller than said second effective outside diameter by the thickness of the trailing helical flight; said support member further including a driving shoulder at the trailing end of said support section engaging the trailing end of said coil member to force said coil member through the holes with said support member.

7. The mandrel assembly of claim 6 wherein said coil member defines a rearwardly facing trailing driven face arranged generally normal to the centerline of said coil member so that said driving shoulder engages said driven face to move said coil member with said support member.

8. The mandrel assembly of claim 6 wherein said support member further includes a fastener having a leading end and connection means for releasably connecting the trailing end of said support section to the leading end of said fastener, said fastener defining said driving shoulder on the leading end thereof to engage the trailing end of said coil member to force said coil member with said support member through the holes in the work pieces.

9. A mandrel assembly for use in expanding holes of an initial diameter through work pieces comprising:
a helically wound coil member having a leading end and including interconnected resilient helical flights; and,
a support member engaging and supporting said coil member about a central axis so that at least the leading helical flight has a first effective outside diameter smaller than the initial hole diameter and at least one of the helical flights trailing the leading helical flight has a second effective outside diameter larger than said first outside diameter; said support member including a support section defining a support surface concentric about said central axis and tapering outwardly from the leading to the trailing end of said support section from a fourth outside diameter less than said first first effective outside diameter by the thickness of said leading helical flight to a trailing fourth outside diameter smaller than said second effective outside diameter by the thickness of the trailing helical flight; said support member further including a fastener coaxial with and trailing said support section, said fastener having a leading end defining a driving shoulder thereon; and further including a back-up washer removably carried by said support section trailing said coil member, engaged by said driving shoulder on said fastener, and engaging the trailing end of said coil member to force said coil member through the holes in the work pieces with said support member.

10. A method of expanding holes of a prescribed nomially constant diameter through work pieces comprising the steps of:
a. supporting a helically wound coil member with interconnected flights so that at least the leading helical flight has a first effective outside diameter smaller than the initial hole diameter and at least one of the helical flights trailing the leading helical flight has a second effective outside diameter larger than said first outside diameter; and,
b. axially forcing the coil member completely through the holes with the leadingmost helical flight leading so that the helical flights trailing the leadingmost flight expands the holes radially out to the second diameter of the trailing flights.

11. The method of claim 10 wherein step a) is performed by supporting the flights on the threads of a threaded fastener.

* * * * *